Feb. 5, 1924.
E. L. WIEGAND
ONE-WAY TRANSMISSION MECHANISM
Filed March 31, 1920
1,482,451
2 Sheets-Sheet 1
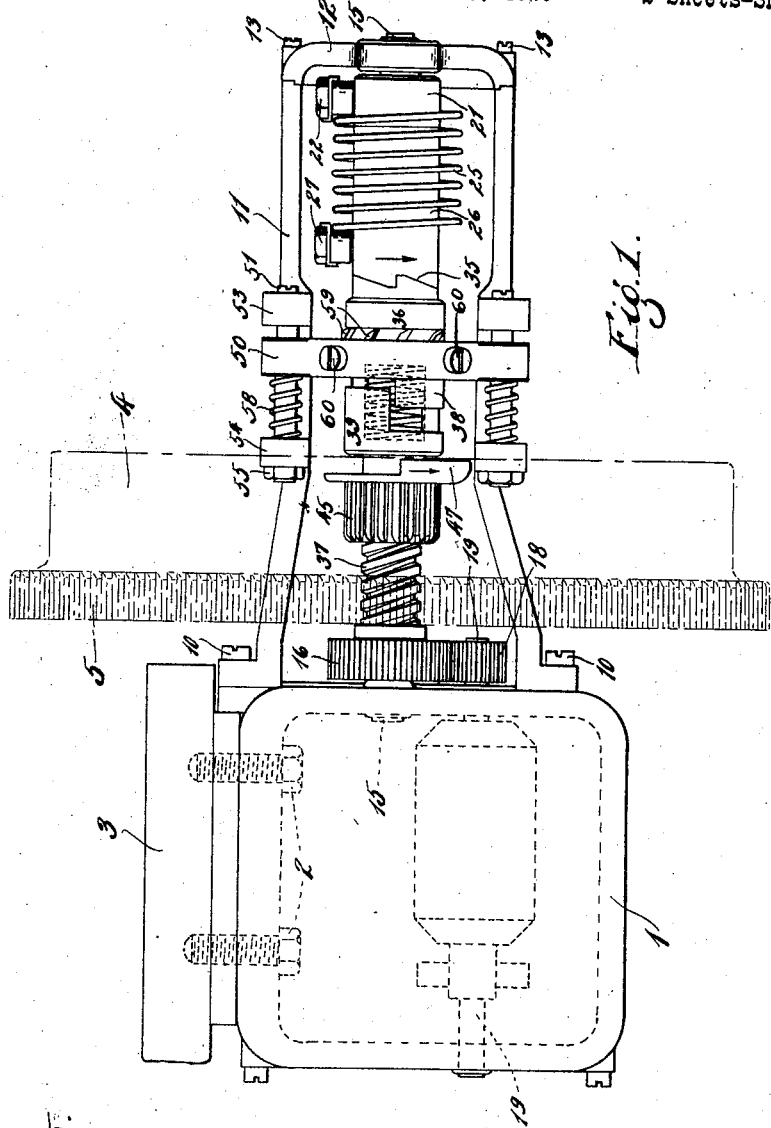
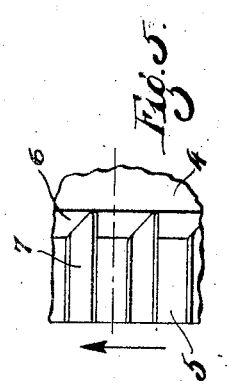
Inventor:
Edwin L. Wiegand
By Hull, Smith, Brock West
Attys.

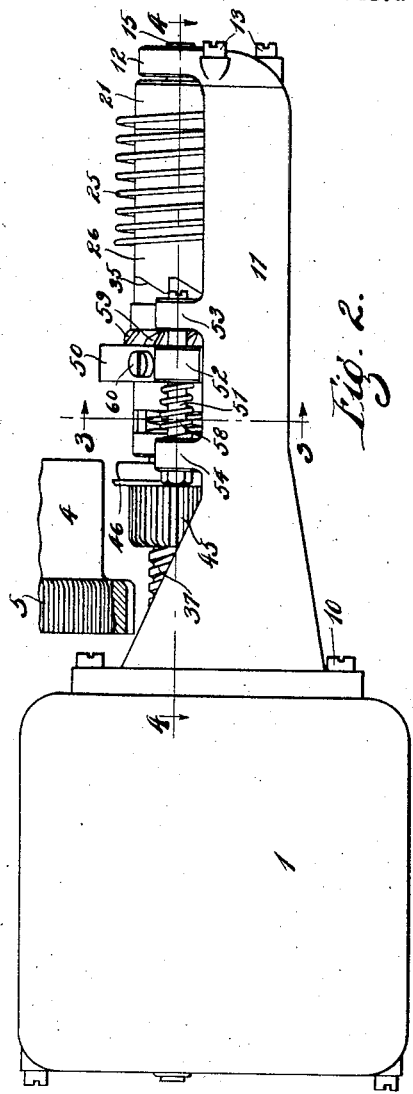

Patented Feb. 5, 1924.

1,482,451

UNITED STATES PATENT OFFICE.

EDWIN L. WIEGAND, OF PITTSBURGH, PENNSYLVANIA.

ONE-WAY TRANSMISSION MECHANISM.

Application filed March 31, 1920. Serial No. 370,295.

*To all whom it may concern:*

Be it known that I, EDWIN L. WIEGAND, a citizen of the United States, residing at Pittsburgh, in the county of Allegheny and State of Pennsylvania, have invented a certain new and useful Improvement in One-Way Transmission Mechanism, of which the following is a full, clear, and exact description, reference being had to the accompanying drawings.

This invention, while of a more general nature, has special reference to improvements in engine starting devices particularly of the well known type shown in certain patents issued to Vincent Bendix, examples of which are Nos. 1,125,939, 1,258,301, 1,288,477, 1,288,478, 1,276,862, and 1,146,992.

It will be recalled that these devices are for starting internal combustion engines and comprises generally an electric motor, and a peculiar transmission mechanism for imparting the motion of the motor to the fly wheel or other convenient part of the engine and involving an eccentrically weighted pinion operating on a helix which latter when turned serves to feed the relatively slowly rotating pinion into mesh with a rack on the fly wheel or some other suitable gear associated with the engine for imparting motion to its crank shaft, the helix acting finally to rotate the pinion at its own speed to drive the engine.

Now it is the purpose of my invention to provide means peculiarly adapted to the Bendix transmission that will infallibly act to disengage the driving connection between the starting motor and the engine in case the engine "back-fires" and thus avoid the damages otherwise likely to be imposed upon the transmission mechanism and starting motor and which are so well known by those familiar with engine practice as to make a recitation of them in this connection unnecessary.

I am aware that numerous attempts have been made to accomplish this end, but with little success when considered from a practical standpoint. They seem to work out satisfactorily in theory but when applied to practice are found wanting. The dominant faults in the majority of these are their slowness in breaking the driving connection between the engine and starting motor during which delay considerable damage may be done; and their tendency to reestablish the driving connection before the reverse movement ceases. To be effectual as a means of safety the disconnection must occur during the first few degrees of reverse rotation of the engine shaft and must prevail until motion in the reverse direction stops.

In pursuance of these results, therefore, I may recite as further objects of my invention the provision of means for the purpose stated that will respond very quickly to the reverse rotation of the engine shaft; and that will effectively maintain the disconnection until the reverse rotation ceases.

A further object is to combine, with means of the nature about set forth, a yielding element interposed between said means and the starting motor and having a shock absorbing capacity ample to retard to a harmless velocity the slight reverse motion that is transmitted before said means becomes fully effective.

A still further object of the invention is to provide a unique design of gear that will facilitate lateral engagement of one gear with another, in the present instance the starter pinion with the rack of the fly wheel or its equivalent.

Other objects are to provide means of the character set forth that are strong and durable; comparatively simple of construction and inexpensive of manufacture, and that are positive of action and thoroughly reliable.

While my improvements are particularly applicable to engine starters of the Bendix type and are shown and described in the present instance as incorporated therein, they are not restricted to use with this style of starter, nor are they confined to this field of industry, for I regard the scope of my invention commensurate with the possibilities of its adaptation. Furthermore, the invention, in certain of its phases, may comprehend any or all of the elements of the Bendix transmission or their equivalent.

Therefore, the broad object of the invention may be expressed as the provision of intermediary engaging and disengaging clutch mechanism permitting the transmission of power, from a prime mover to an element to be driven, by rotation in one predetermined direction only, and preventing transmission of power from the latter element to the prime mover by rotation in either direction.

With the foregoing objects in view, my invention may be defined as consisting of the combinations of elements set forth in the claims annexed hereto and illustrated in the drawings accompanying and forming a part hereof and wherein Fig. 1 is an elevational view of an engine starter incorporating my invention and observed as though looking in a direction away from the fly wheel, the fly wheel being shown in dot-and-dash lines; Fig. 2 shows the parts of Fig. 1 as viewed from below; Fig. 3 is a section on the line 3—3 of Fig. 2; Fig. 4 is an enlarged sectional view on the line 4—4 of Fig. 2; while Fig. 5 shows a fragment of the fly wheel; and Fig. 6 is a sectional detail thereof.

The starter which I have elected as an illustrative embodiment of my invention is a self-contained structure including a motor, the casing whereof is designated 1, the structure being attached by means of screws 2 to a support 3 whereby it is sustained in operative relation to the fly wheel 4 of an engine (not shown). The fly wheel is provided with a circumferential rack 5, and the base thereof on the side to which the starting pinion is presented is chamfered to produce a frusto-conical surface 6 for a purpose which will hereinafter be explained. This is clearly illustrated in Fig. 6. By reference now to Fig. 5 it will be seen that the corresponding ends of the teeth 7 are cut away at an angle on the advancing side of the teeth when considering the normal direction of rotation of the fly wheel as indicated by the arrow in Fig. 5.

Attached, as by screws 10, to the front side of the motor casing is a housing 11 that is shown as having a removable outer end 12, held in place by screws 13. A shaft 15 has its ends journaled in suitable bearings in the end wall of the motor casing and in the removable end 12 of the housing 11. A gear 16 is secured, as by a key 17, to the shaft 15 adjacent the motor casing, and meshing with this gear is a drive pinion 18 on the armature shaft 19 of the motor, the armature and other parts of the motor associated therewith being shown in dotted lines in Fig. 1.

Near its outer end, the shaft 15 is enlarged in diameter, as shown at 20, and to the enlargement is secured a collar 21 by means of a screw 22 which serves also as an anchorage for one end of a spring 25 coiled loosely about a sleeve 26 that is mounted for limited rotation upon the enlargement 20 and is held against longitudinal movement with respect thereto by a screw 27 that is threaded through a tapped hole in the sleeve and has its inner end reduced at 28 and projected into a circumferential groove 29 of the shaft enlargement 20, the outer end of the screw 27 having secured to it the opposite end of spring 25.

The inner end of sleeve 26 is shaped to provide one face of a unidirectional clutch which I shall designate, as a whole, 35, the other face of the clutch being incorporated in a member 36 that is slidably and rotatably carried by the shaft 15. The opposite end of the member 36 has a telescopic coupler connection with the adjacent end of a sleeve 37 through interengaging jaws 38 and 39 of these respective parts. The sleeve 37 is mounted to rotate freely on shaft 15, and it has on its exterior a helical thread (in the present case, multiple) and for convenience I shall refer to the sleeve hereinafter at times as the helix. A compression spring 40 confined between the opposed ends of the member 36 and sleeve 37 tends to maintain the member 36 in a position to engage its clutch face with that of the sleeve 26.

What I have already alluded to as the starter pinion is designated 45, and it operates in the nature of a nut on the helical thread of the sleeve 37. One end of the pinion is shown as provided with a flange 46 that is weighted on one side by an enlargement 47; and the end of the teeth opposite the flange 46 are inclined on their following sides when considering the normal direction of rotation of the pinion, as indicated by the arrow in Fig. 1. The thread of sleeve 37 terminates at each end in an abrupt abutment to prevent the pinion sticking when fed to either end, the one at the end adjacent the gear 16 being provided by the flange 49.

The parts so far described will function substantially like a standard Bendix starter, and the operation may be briefly described as follows: When the starting motor is energized it will drive, through its pinion 18 and the gear 16, shaft 15. The motion will be transmitted with varying effect through spring 25 to the sleeve 26 and then through clutch 35 to the member 36. By reason of the latter's telescopic coupler connection with it, the sleeve 37 will be rotated and, through its helix, the eccentrically weighted and therefore relatively slowly rotating pinion 45 will be moved toward and into mesh with the rack of the fly wheel. When the pinion arrives at the end of its excursion along the sleeve 37 and abuts the flange 49, at which time it is fully in mesh with the rack, it will rotate with the sleeve and drive the fly wheel in a direction to start the engine. As soon as the engine starts running on its own power, the circumferential speed of the fly wheel will exceed that of the sleeve 37 and whirl the pinion 45 in a direction to cause it to travel backwardly along the helix in a direction to withdraw itself from the rack, thereafter to return to normal position.

The meshing of the pinion with the rack of the fly wheel is greatly facilitated by reason of the novel gear design provided by this invention, as hereinbefore described. By inclining the ends of the teeth the spaces between them are materially widened and as a consequence there is less flat surface against which the beveled ends of the pinion teeth might meet end-on. Also by chamfering the side of the rack base to provide the frusto-conical portion 6, greater leeway is allowed the pinion and prevents the ends of its teeth abutting the side of the rack should the pinion fit loosely upon the sleeve, or the starter shaft be slightly out of alignment and not in proper relation to the engine shaft. In this manner, slight irregularities which are apt to occur in the commercial production of the device are compensated for.

I shall now proceed to describe the elements which comprise, with the member 36, the means whereby transmission of any appreciable motion from the engine to the starting motor is prevented.

50 is a yoke which surrounds the member 36 and is guided axially thereof on rods 51 that pass, with a sliding fit, through apertures in ears 52 extending from the opposite sides of the yoke. The rods are in the nature of screws that pass freely through and are supported at one end in lugs 53 of the housing 11 and at their opposite ends are screwed through tapped holes in similar lugs 54 and beyond which they are equipped with locking nuts 55. The yoke 50 is urged toward the lugs 53 by compression springs 58 that are confined between lugs 54 and ears 52.

To the attainment of the end in view, I provide a sort of screw-like connection between the yoke and the member 36 which will produce sufficient relative axial movement between the yoke and member to disengage the clutch face of the latter from the clutch face of sleeve 26. In the present instance I accomplish this by forming helically disposed teeth 59 on the periphery of the member 36 and project screws 60 through the yoke to form abutments for co-operation with said teeth, the screws being threaded through the yoke and having their inner ends smooth and reduced, as illustrated in Fig. 3.

With the parts at rest, the abutments or screws 60 may engage the left hand end of the teeth 59 (as the parts are viewed in the drawings) or they may occupy a position anywhere to the right of that point along the teeth within the scope of their travel, which is limited in a right hand direction by the engagement of the gears 52 with the lugs 53, their position being dependent upon the angular disposition of the member 36, it being remembered that the member 36 is normally maintained in an extreme right hand position with its clutch face in engagement with that of the sleeve 26 through the action of spring 40.

Referring back to the normal operation of the device, it will be recalled that the motion of the starting motor is transmitted with yielding power through the spring 25 on the sleeve 26, and thence through the clutch 35, member 36, etc., to the fly wheel. During this action, the member 36 is rotated in a direction to cause its teeth 59 to ratchet over the abutments or screws 60, so to speak, vibrating the yoke 50 under the action of the springs 58 but so slightly as not to be objectionable, especially inasmuch as the vibration endures only while the starting mechanism is in operation.

Now, in case the engine back-fires, with the resultant quick reverse rotation of the fly wheel, the starter pinion 45. sleeve 37 and member 36 will be driven backwardly at a comparatively high velocity. Just as soon as the member 36 starts rotating in abnormal direction, its teeth 59 will cam the screws 60 in a direction to throw the yoke to the right until it is stopped by the engagement of its ears 52 with lugs 53, after which the teeth will, with a camming action against the screws, remove themselves to the left beyond the screws and thereby disengage the clutch 35, the teeth, thereafter, ratcheting over the screws 60 as long as reverse rotation continues. Just as soon as the parts come to rest, the spring 40 will project the member 36 in a direction to reengage the clutch, unless, however, the ends of the teeth 59 should happen to bear directly against the screws 60. The extreme ends of the teeth 59 being exceedingly narrow, as shown in Figs. 1 and 2, practically precludes such a situation arising; and as long as the screws are in contact with the inclined ends or sides of the teeth 59, the action of spring 40 is sufficient to impart rotation to the member 36 and cause it to adjust itself properly with respect to the sleeve 26. Let it be supposed, however, that the teeth 59 and screws 60 do meet end-on at the moment the reverse rotation ceases, the invariable recoil or oscillation of the fly wheel may be depended upon to remove the ends of the teeth from the screws and allow the member 36 to move in a direction to engage its clutch face with the clutch face of the sleeve 26.

During that slight interval of time between the start of the reverse rotation of the fly wheel and the complete withdrawal of the clutch face of member 36 from that of the sleeve 26, the motion of the fly wheel will be imparted to the sleeve 26. However, this motion will be greatly retarded by the spring 25 before it is transmitted to the starting motor.

Attention is directed to a function of the telescopic coupler connection between the helix 37 and member 36, additional to that already explained. Although I have shown the meeting ends of the fly wheel rack teeth and the teeth of the starter pinion inclined to facilitate meshing, it is within the realm of possibilities that occasionally the teeth will meet end-on and momentarily block the progress of the pinion. In such a case, the helix may retract, by virtue of the aforesaid connection, against the action of spring 40 until the teeth properly interengage. By this same provision, blunt ended teeth of the usual design may be substituted for the special teeth having inclined ends with quite satisfactory results.

Having thus described my invention, what I claim is:—

1. The combination of two axially aligned rotary members having cooperating clutch faces, one of said members being movable axially to engage its clutch face with and disengage it from the clutch face of the other, an element movable in a course substantially parallel to the axis of said member, said member and element having cooperating parts of such nature that when the member rotates in normal direction it moves the element, and when it rotates in abnormal direction is moved by the element to disengage its clutch face from the clutch face of the other member.

2. The combination of two axially aligned rotary members having cooperating clutch faces, one of said members being movable axially to engage its clutch face with and disengage it from the clutch face of the other, an element movable in a course substantially parallel to the axis of said member, said member and element having cooperating parts, means urging the element in a direction to engage its part with the part of the member, the parts being of such nature than when the member rotates in normal direction it moves the element against the action of the aforesaid means, and when it rotates in abnormal direction, is moved by the element to disengage its clutch face from the clutch face of the other member.

3. The combination of two axially aligned rotary members having cooperating clutch faces, one of said members being movable axially to engage its clutch face with and disengage it from the clutch face of the other, an element movable in a course substantially parallel to the axis of said member, the member having a plurality of helically disposed projections and the element having abutments for cooperation with the projections, means tending to retain the element at one end of its course of movement with its abutments in the normal part of the projections, the projections serving when the member rotates in the normal direction to shift the element in opposition to the aforesaid means, but when the member rotates in abnormal direction, to shift said member in a direction to disengage its clutch face from the clutch face of the other member.

4. The combination of two axially aligned rotary members having cooperating clutch faces, one of said members being movable axially to engage its clutch face with and disengage it from the clutch face of the other and having a helically disposed peripheral projection, an abutment shiftable in one direction only from a position in the path of the projection, means tending to retain the abutment in said position, the projection serving when the member rotates in normal direction to shift the abutment in opposition to said means, but when the member rotates in abnormal direction, to shift the member in a direction to disengage its clutch face from the clutch face of the other member.

5. In mechanism of the character set forth, the combination of two rotatable members spaced axially apart, one of said members under normal conditions being the driving and the other driven member, an element interposed between said members and movable axially with respect thereto and having unidirectional clutch connection with one and constant driving connection with the other, a device fixed against rotation but capable of movement axially of and with respect to the element and having therewith a screw-like engagement of limited extent, and means urging the device in a direction to effect such engagement, the screw-like engagement being of such nature that when driving conditions are normal the device is withheld from effective engagement with the element but when said conditions are reversed the engagement becomes effective and the element is moved to interrupt its clutch connection with the aforesaid member.

6. In combination with an internal combustion engine and a gear having operative connection with the shaft thereof, a prime mover, a helix, a pinion on the helix adapted to be moved thereby into mesh with the aforesaid gear when the helix is rotated, transmission mechanism having operative connection with the prime mover and including a yielding element and a unidirectional clutch, and means interposed between the clutch and helix which functions to disengage the clutch when the helix is rotated in abnormal direction as a consequence of a reverse rotation of the engine shaft.

7. In combination with an engine and a gear having operative connection with the shaft thereof, a prime mover, a helix, a pinion on the helix adapted to be moved thereby into mesh with the aforesaid gear when the helix is rotated, transmission mechanism having operative connection with the prime mover and including a yielding element and one member of a clutch, a second clutch member for cooperating with and movable toward and from the first and having driving connection with the helix, and means acting to withdraw the second clutch member from engagement with the first upon rotation of the helix in abnormal direction as a consequence of a reverse rotation of the engine shaft.

8. In combination with an internal combustion engine and a gear having operative connection with the shaft thereof, a prime mover, a helix, an eccentrically weighted pinion on the helix adapted to be moved thereby into mesh with the aforesaid gear when the helix is rotated, transmission mechanism having operative connection with the prime mover and including a yielding element and one member of a clutch, a second clutch member for cooperation with and movable toward and from the first and having driving connection with the helix, said second clutch member having helically disposed peripheral projections, a yoke embracing and movable axially of the second clutch member and having abutments for cooperation with the projections thereof, a guide whereon the yoke is movable, means tending to maintain the yoke at one limit of its movement with its abutments in the normal path of the projections, the inclination of the projections being such that when the second clutch member rotates in normal direction it will shift the yoke against the action of the aforesaid means, but when said clutch member is rotated in abnormal direction it will serve by cooperation with the abutments of the yoke to shift the second clutch member out of engagement with the first.

In testimony whereof, I hereunto affix my signature.

EDWIN L. WIEGAND.